United States Patent
Balk

(10) Patent No.: US 8,562,030 B2
(45) Date of Patent: Oct. 22, 2013

(54) ELECTRONIC MOBILE DEVICE COVER LATCH MECHANISM

(75) Inventor: Cody Allen Balk, Rolling Meadows, IL (US)

(73) Assignee: BlackBerry Limited, Waterloo, Ontario (CA)

( * ) Notice: Subject to any disclaimer, the term of this patent is extended or adjusted under 35 U.S.C. 154(b) by 462 days.

(21) Appl. No.: 12/626,402

(22) Filed: Nov. 25, 2009

(65) Prior Publication Data

US 2011/0121584 A1    May 26, 2011

(51) Int. Cl.
*E05C 9/00*    (2006.01)
*E05C 3/00*    (2006.01)

(52) U.S. Cl.
USPC ............... 292/44; 292/DIG. 63; 292/DIG. 11

(58) Field of Classification Search
USPC ............................ 292/DIG. 63, DIG. 11, 44
See application file for complete search history.

(56) References Cited

U.S. PATENT DOCUMENTS

| | | | |
|---|---|---|---|
| 6,802,107 B2 | 10/2004 | Pan | |
| 2004/0266498 A1* | 12/2004 | Qin et al. | 455/575.1 |
| 2005/0011047 A1 | 1/2005 | Lu | |
| 2006/0141344 A1* | 6/2006 | Chen et al. | 429/97 |
| 2007/0122693 A1 | 5/2007 | Qin et al. | |
| 2007/0277349 A1 | 12/2007 | Yu | |
| 2009/0072548 A1 | 3/2009 | Yang | |
| 2009/0124305 A1 | 5/2009 | Tanimoto | |

OTHER PUBLICATIONS

Blackberry Door Latch, http://www.alibaba.com/product-gs/236184817/Brand_new_Blackberry_patch_locks_door.html, publication date unknown.
Door Lock Latch, http://www.alibaba.com/product-gs/51578454/Latch_lock_door_lock_html, publication date unknown.
Car Cylinder Lock, https://w05.dealerconnect.chrysler.com/service/mds2002/serviceinfo/en_US/80161b95.gif. publication date unknown.
European Search Report for Application No. 09177106.3, mailed Feb. 18, 2010.

* cited by examiner

*Primary Examiner* — Carlos Lugo
*Assistant Examiner* — Mark Williams
(74) *Attorney, Agent, or Firm* — Quarles & Brady LLP

(57) ABSTRACT

An electronic mobile device comprises a base defining a compartment opening and a cover movably supported by the base to restrict access to the compartment opening. The device further comprises a latch supported by one of the base and the cover and a catch pivotably supported by the other of the base and the cover. The catch pivots in a first direction to engage and move the latch relative to the catch and thereby move at least a portion of the cover away from the compartment opening.

19 Claims, 9 Drawing Sheets

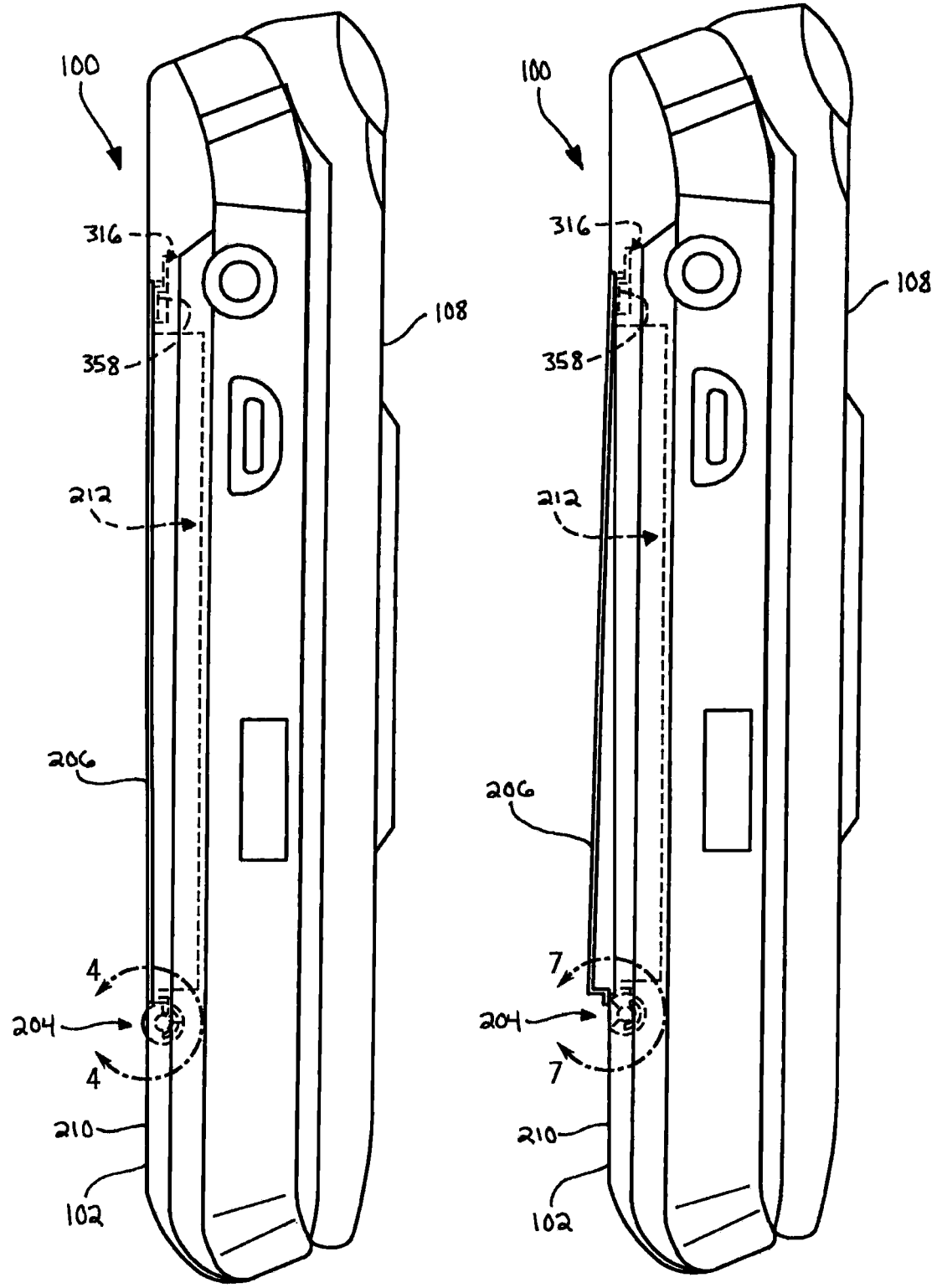

ELECTRONIC MOBILE DEVICE COVER LATCH MECHANISM

CROSS-REFERENCE TO RELATED APPLICATION

Not applicable.

STATEMENT OF FEDERALLY SPONSORED RESEARCH OR DEVELOPMENT

Not applicable.

BACKGROUND OF THE DISCLOSURE

This disclosure relates to electronic mobile devices. In particular, this disclosure relates to electronic mobile devices having removable covers for securing, for example, internal battery compartments.

Many types of electronic mobile devices such as cellular phones, personal digital assistants (PDAs), notebook computers, digital media players and the like, include an internal compartment that stores one or more common components such as batteries, removable memory devices, data ports and the like. The internal compartment is typically accompanied by a protective removable plate or cover. The removable cover is normally locked in a position restricting access to the internal compartment. In some cases a user may depress a tab to unlock the cover. The user may then remove the cover to gain access to the components housed in the internal compartment.

Unfortunately, removing the cover after depressing the tab can be frustratingly difficult. Specifically, an unlocked removable cover can be difficult to manipulate due to the need to pry between the cover and the phone base. In extreme cases, it is most effective to insert an additional tool, such as a ballpoint pen or a paper clip, between the cover and the phone base to remove the cover.

BRIEF DESCRIPTION OF THE DRAWINGS

The disclosure will hereafter be described with reference to the accompanying drawings, wherein like reference numerals denote like elements, and:

FIG. 3 is a side view of the electronic mobile device of FIG. 1 with the compartment cover in the closed position;

FIG. 6 is a side view of the electronic mobile device of FIG. 1 with the compartment cover in the open position;

DETAILED DESCRIPTION OF THE DRAWINGS

Figure 1:
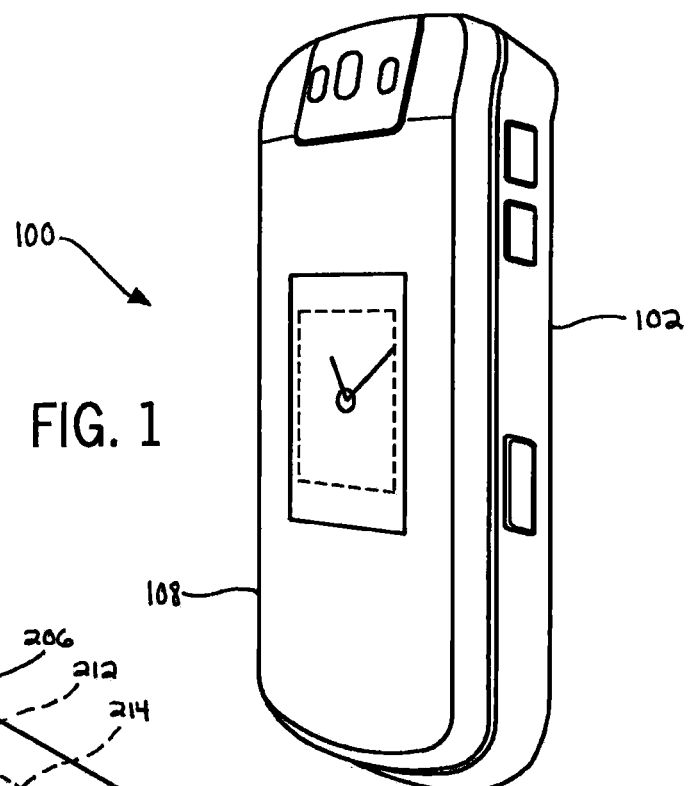
FIG. 1 is a front perspective view of an electronic mobile device incorporating a latch mechanism that assists a user in removing a compartment cover from the electronic mobile device.

An electronic mobile device comprises a base defining a compartment opening and a cover movably supported by the base to restrict access to the compartment opening. The device further comprises a latch supported by one of the base and the cover and a catch pivotably supported by the other of the base and the cover. The catch pivots in a first direction to engage and move the latch relative to the catch and thereby move at least a portion of the cover away from the compartment opening.

The electronic mobile device may further comprise a detent mechanism to hold the catch in a position in which the catch holds the at least a portion of the cover away from the compartment opening.

The catch may be pivotable in a second direction to engage the latch and thereby hold the cover in a position to restrict access to the compartment opening.

The electronic mobile device may further comprise a torsion spring biasing the catch to pivot in the second direction.

The catch may include a lock surface engageable with the latch to thereby hold the cover in the position to restrict access to the compartment opening. The catch may further include an unlock surface engageable with the latch to move the latch relative to the catch and thereby move the at least a portion of the cover away from the compartment opening.

The latch may be supported by the base and the catch may be pivotally supported by the cover.

The latch may include a plurality of spline teeth, and the catch may include a spline-shaped outer surface that engages the plurality of spline teeth to move the latch relative to the catch and thereby move the cover away from the compartment opening as the catch pivots in the first direction.

An electronic mobile device comprises a base and a cover removably supported by the base. The cover is movable from a closed position to an open position and vice versa. The device further comprises a latch supported by one of the base and the cover and a roller pivotably supported by the other of the base and the cover. The roller is pivotable from a lock position to an unlock position and vice versa. In the lock position the roller engages the latch to thereby hold the cover in the closed position, and in the unlock position the roller engages the latch to thereby support the cover in the open position.

The roller may include a lock surface and a unlock surface, in the lock position the lock surface engages the latch to thereby hold the cover in the closed position, and in the unlock position the unlock surface engages the latch to thereby support the cover in the open position.

The unlock surface may engage the latch in an intermediate position between the lock position and the unlock position, and engagement between the unlock surface and the latch moves the latch relative to the roller as the roller pivots from the intermediate position to the unlock position.

The roller may have a generally semi-cylindrical shape.

The electronic mobile device may further comprise a detent mechanism to hold the roller in the unlock position when the roller is pivoted to the unlock position and a torsion spring that biases the roller toward the lock position.

An electronic mobile device comprises a base defining a compartment opening and a roller recess at a first end of the compartment opening. The device further comprises a cover removably supported by the base. The cover is movable between a closed position to an open position. In the closed position the cover restricts access to the compartment opening, and in the open position at least a portion of the cover is disposed away from the compartment opening. A latch is supported at a first end of the cover. The device further comprises a roller pivotably supported by the base in the roller recess. The roller is pivotable in a first direction and a second direction. When pivoting in the first direction the roller moves towards an unlock position in which the roller engages the latch to thereby support the cover in the open position. When pivoting in the second direction the roller moves towards a lock position in which the roller engages the latch to thereby hold the cover in the closed position. The device further comprises a detent mechanism that holds the roller in the unlock position when the roller is pivoted to the unlock position and a spring biasing the roller to pivot in the second direction.

The roller may further comprise a pivot axle pivotally supported by the base and a body supported by the pivot axle. The body includes an outer surface and a lock surface disposed radially inwardly from the outer surface. In the lock position the lock surface engages the latch to thereby hold the cover in the closed position. The generally semi-cylindrical body further includes a unlock surface disposed radially inwardly from the outer surface. In the unlock position the unlock surface engages the latch to thereby support the cover in the open position.

The outer surface of the roller may be a tactile outer surface.

The lock surface and the unlock surface may be angularly spaced apart.

The detent mechanism may comprise a first detent track at a first side wall of the roller recess and a first projection supported by a first lateral end of the roller. The first projection slides within the first detent track as the roller pivots.

The detent mechanism may further comprise a second detent track at a second side wall of the roller recess and a second projection supported by a second lateral end of the roller. The second projection slides within the second detent track as the roller pivots.

A second end of the compartment opening may include a slide latch recess, and the device may further comprise a slide latch supported at a second end of the cover. The slide latch is disposed in the slide latch recess when the cover is in both the closed position and the open position.

The latch may include a leg extending perpendicularly from the cover and a foot extending perpendicularly from the leg. The foot engages the roller when the cover is in both the closed position and the open position.

Figure 2:
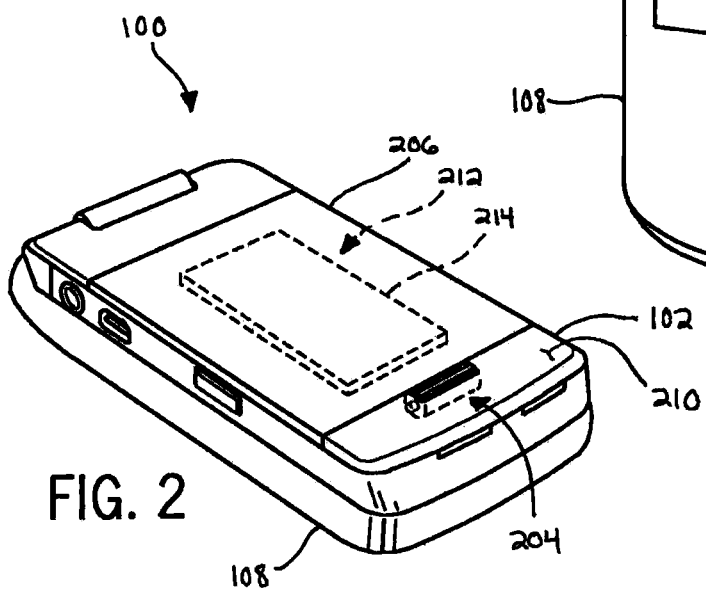
FIG. 2 is a rear perspective view of the electronic mobile device of FIG. 1 illustrating a compartment cover of the electronic mobile device in a closed position.
Figure 5:
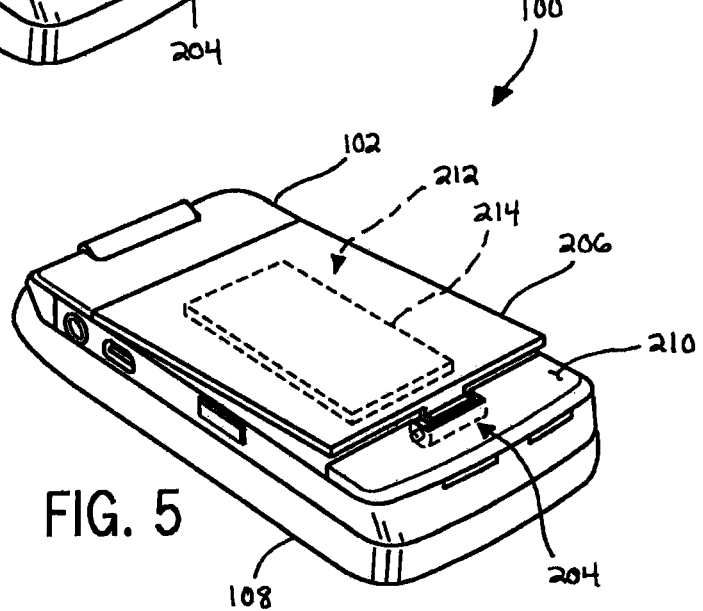
FIG. 5 is a rear perspective view of the electronic mobile device of FIG. 1 with the compartment cover in an open position.

Referring now to the drawings wherein like reference numerals correspond to similar elements throughout the several views, the present disclosure will be described in the context of an electronic mobile device 100 such as a cellular phone, although the present disclosure is also applicable to other devices such as PDAs, notebook computers, digital media players, mobile reading devices, digital cameras, global positioning system (GPS) devices, portable video game systems, and the like. Referring specifically to FIGS. 1-2, the electronic mobile device 100 includes a base 102 that supports a locking or latch mechanism 204 for securing a removable back plate or compartment cover 206 to the base 102.

Referring to FIGS. 1-11, in some embodiments, the base 102 pivotally supports a front flip-type cover 108. The base 102 also supports one or more input panels (not shown), such as a keypad, a combination of a keypad and a trackball, a touch-sensitive panel, or the like. Furthermore, the base 102 houses one or more microprocessors (not shown) that control operations of the electronic mobile device 100. A rear surface 210 of the base 102 defines an accessory compartment opening 212 that houses one or more internal components 214, such as batteries, removable memory cards, and the like.

Referring more specifically to FIGS. 3-11, a first end of the compartment opening 212 includes two spaced apart slide latch recesses 316 (FIG. 10), which, in some embodiments, have a three-dimensional L-shape. The slide latch recesses 316 accommodate part of the compartment cover 206 as described in further detail below. A second end of the compartment opening 212 includes a roller recess 418 (see FIG. 11) that in some embodiments has a partially circular cross-sectional shape. The roller recess 418 also has first and second side walls 420 (one shown in FIG. 11 and both shown in FIG. 8) that each define a pivot axle support hole 822, a torsion spring support hole 424, and a detent track 426. The first and second detent tracks 426 each include a slightly elevated shoulder surface 428 that, in some embodiments, is made of a resilient material (e.g., resilient plastic). The detent track 426 provides an arcuate path, in some embodiments, over an angle of about 135 degrees. The aforementioned features and surfaces of the roller recess 418 receives the latch mechanism 204 as described below.

Figure 4:
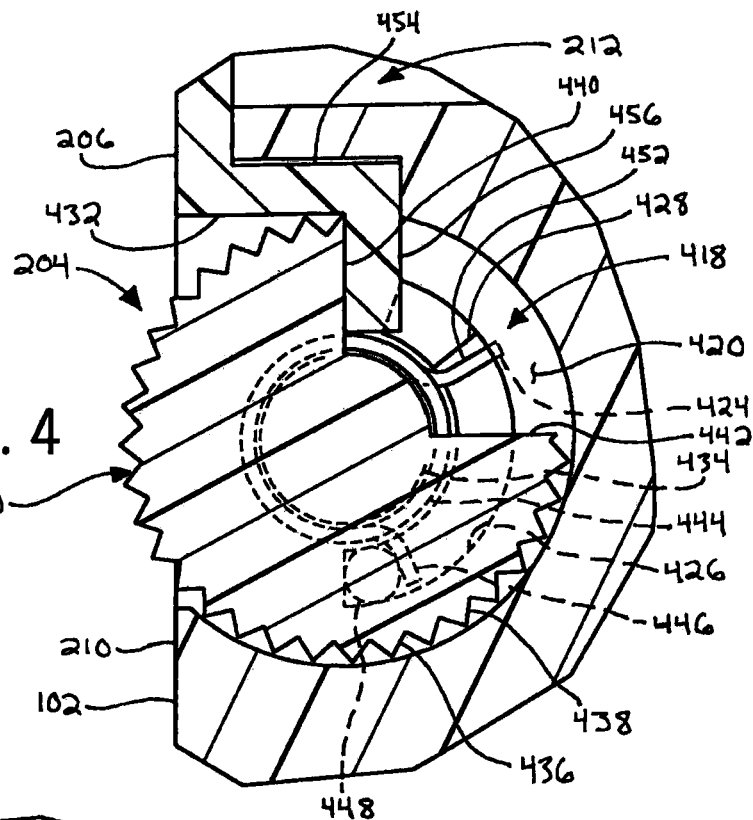
FIG. 4 is a detail view of the area enclosed by line 4-4 of FIG. 3 illustrating the latch mechanism in a locked position.
Figure 7:
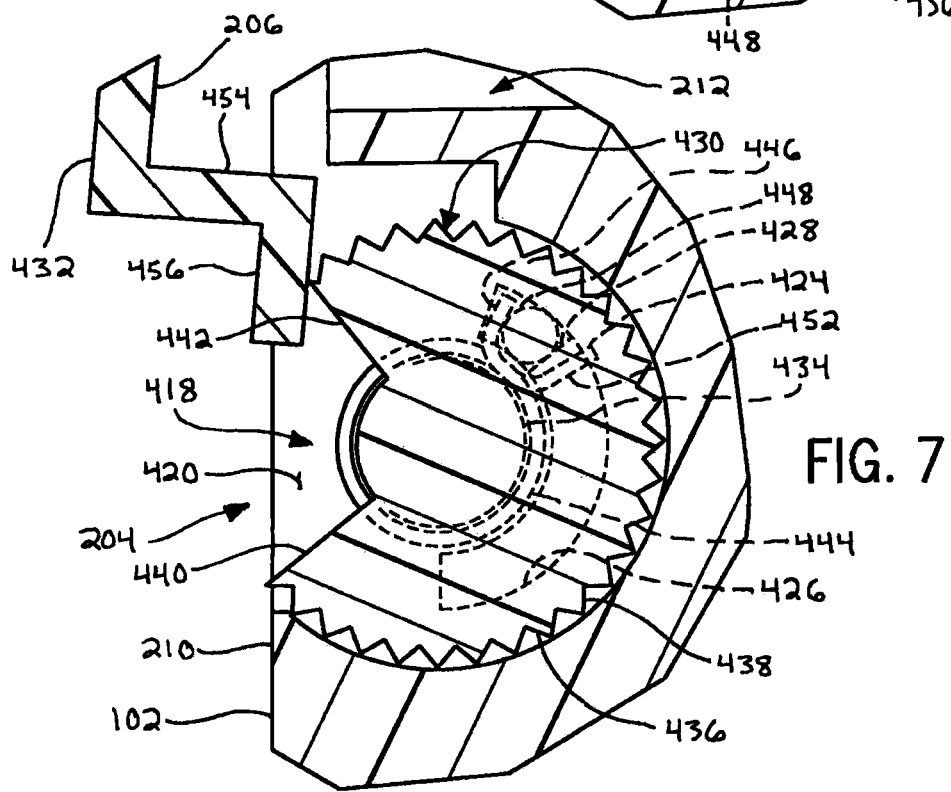
FIG. 7 is a detail view of the area enclosed by line 7-7 of FIG. 6 illustrating the latch mechanism in an unlocked position.

Referring now to FIGS. 4-7 and 12-15, the latch mechanism 204 includes a catch or roller 430 and a torsion spring 444 (shown in partial phantom in FIGS. 4 and 7). The roller 430 includes a cylindrical pivot axle 434 having ends that are dimensioned to be received by the pivot axle support holes 822 (see again FIG. 11) of the roller recess 418. As such, the roller 430 is pivotable in a counter-clockwise or first direction toward the position shown in FIG. 7. The roller 430 is also pivotable in a clockwise or second direction toward the position shown in FIG. 4.

The pivot axle 434 supports a main body 436 of the roller 430. In some embodiments, the body 436 has a generally semi-cylindrical shape and first and second lateral ends 1250. As used herein, the term "generally semi-cylindrical" and variations thereof mean that the main body 436 is a partial cylinder (e.g., a three-quarter cylinder) including a tactile outer surface 438. As used herein, the term "tactile" and variations thereof means that a surface has a non-uniform shape along the surface to enable user manipulation. In some embodiments and as shown in FIGS. 12-15, the tactile outer surface 438 is a spline surface.

Figure 15:
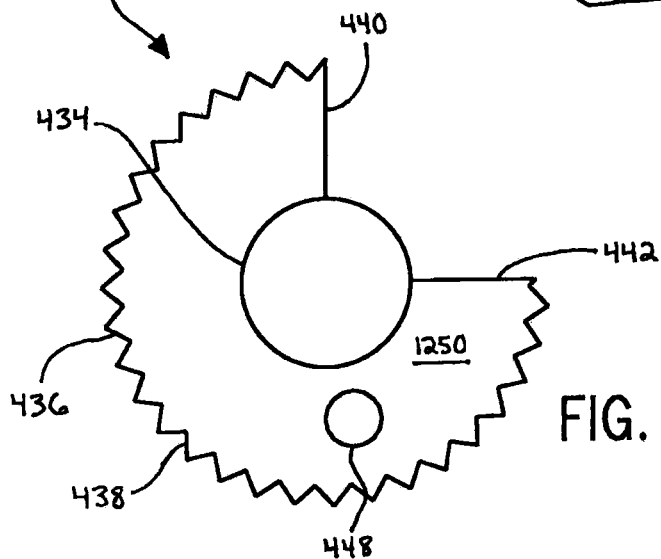
FIG. 15 is a side view of the roller of FIG. 12.
Figure 12:
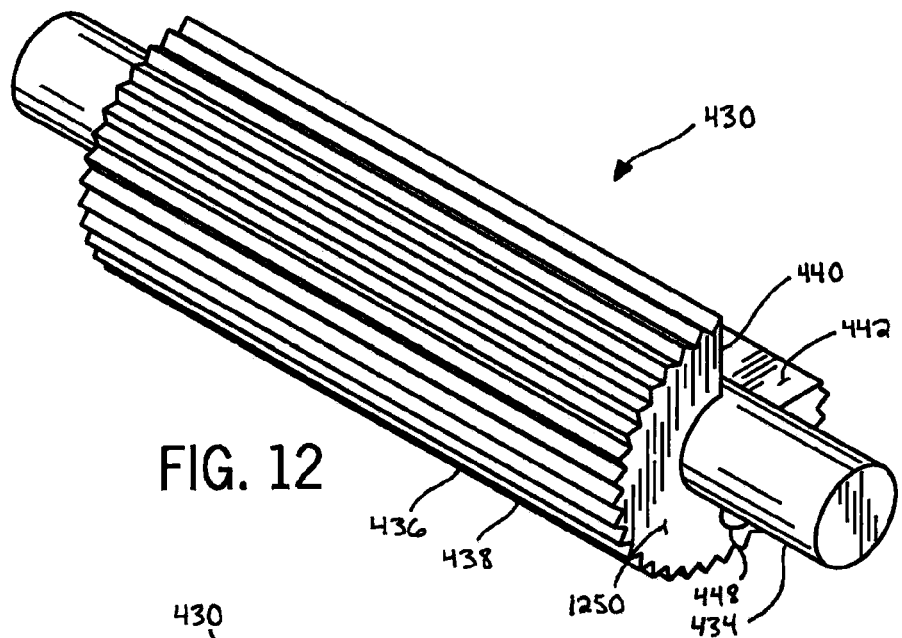
FIG. 12 is a perspective view of a roller of the electronic mobile device of FIG. 1.
Figure 13:
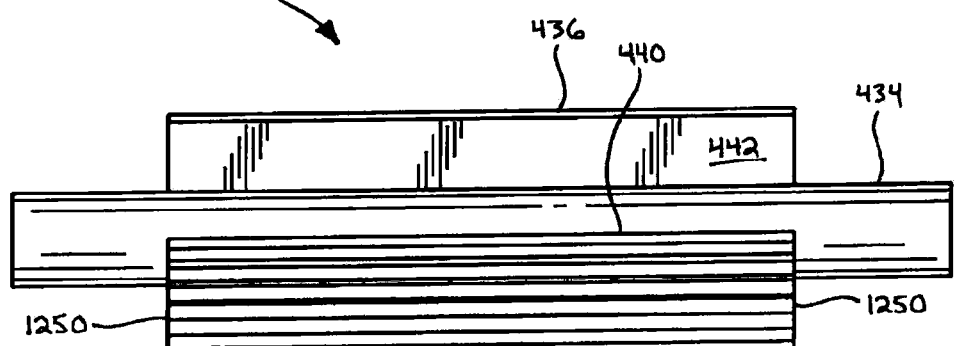
FIG. 13 is a top view of the roller of FIG. 12.
Figure 14:
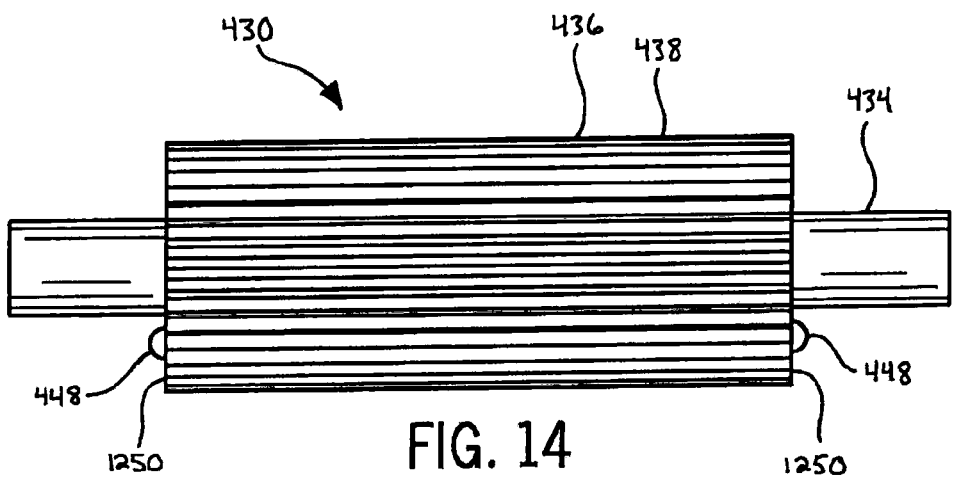
FIG. 14 is a front view of the roller of FIG. 12.
Figure 16:
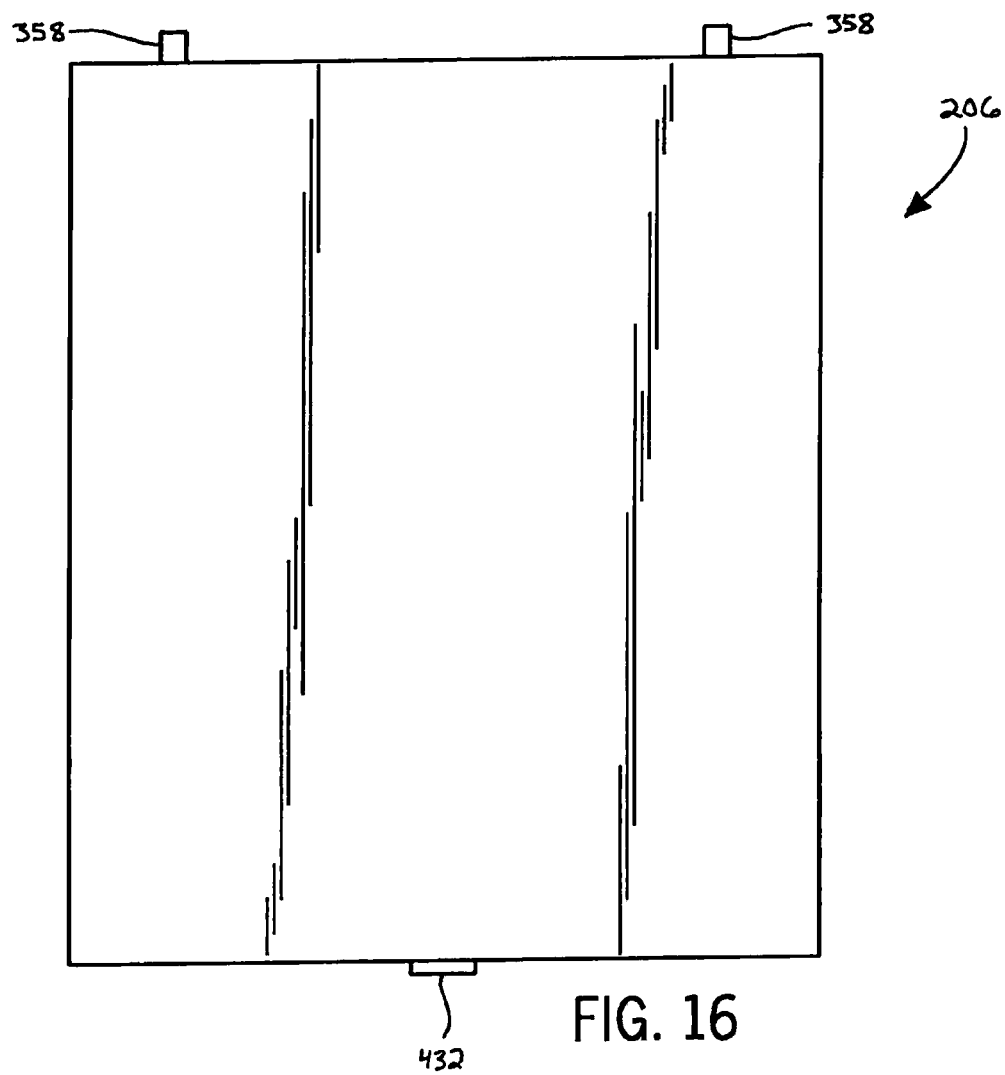
FIG. 16 is a top view of the compartment cover of the electronic mobile device of FIG. 1.
Figure 17:
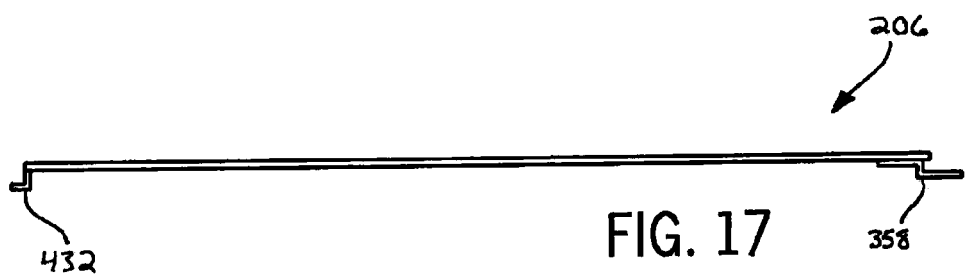
FIG. 17 is a side view of the compartment cover of FIG. 16.

The body 436 has a cut-away portion along one side that amounts to approximately one fourth of the cylinder shape so that two essentially flat surfaces 440 and 442 (see FIG. 15)

extend radially from the axle 434 to the outer surface of the main body 436. In at least some embodiments, the surfaces 440 and 442 form an angle between 90 and 100 degrees relative to one another. The surfaces 440 and 442 are referred to hereinafter as lock and unlock surfaces, respectively. Hereinafter, unless indicated otherwise, the cut-away portion of the roller 430 will be referred to as the roller opening. Referring to FIGS. 14 and 15, first and second projections 448 extend from first and second lateral ends 1250 of the body 436, respectively, at an angular position substantially 180 degrees from the lock surface 440. The lateral projections 448 are relatively short yet long enough to interface with the deviated shoulder surface 428 (see again FIG. 11) when the roller 430 is mounted in the roller recess 418.

Referring now to FIGS. 4-7, 16, and 17, the compartment cover 206 is a generally flat panel that supports a latch 432 at a first end. The latch 432 includes a leg 454 that extends perpendicularly from the cover 206, and a foot 456 extends perpendicularly from the leg 454. The foot 456 engages the lock surface 440 and the unlock surface 442 in a closed position (FIGS. 2-4) and an open position (FIGS. 5-7) of the cover 206, respectively.

Figures 8, 9:
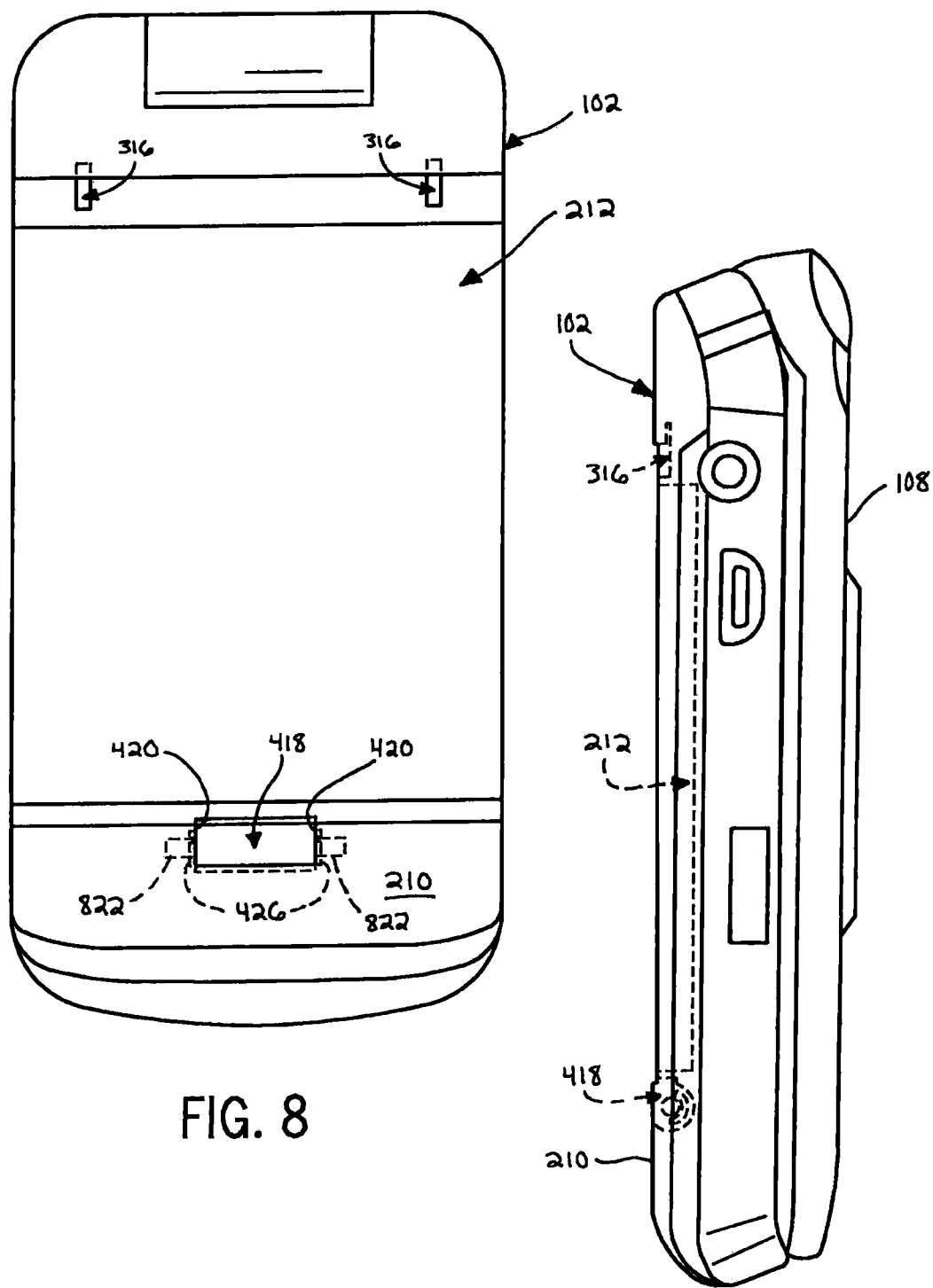
FIG. 8 is a top view of a base of the electronic mobile device of FIG. 1.
FIG. 9 is a side view of the base of FIG. 8.
Figure 10:
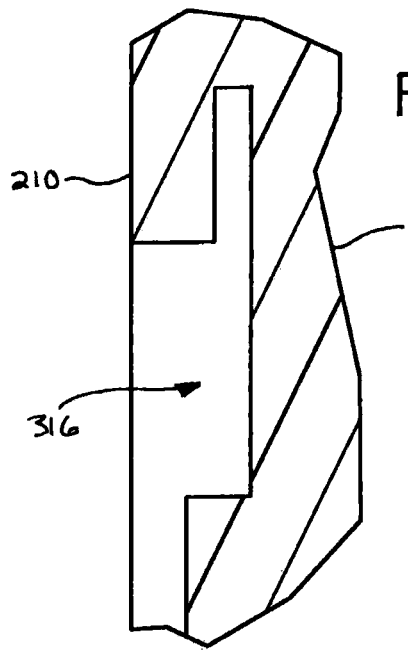
FIG. 10 is a detail view of the area enclosed by line 10-10 of FIG. 9.
Figure 11:
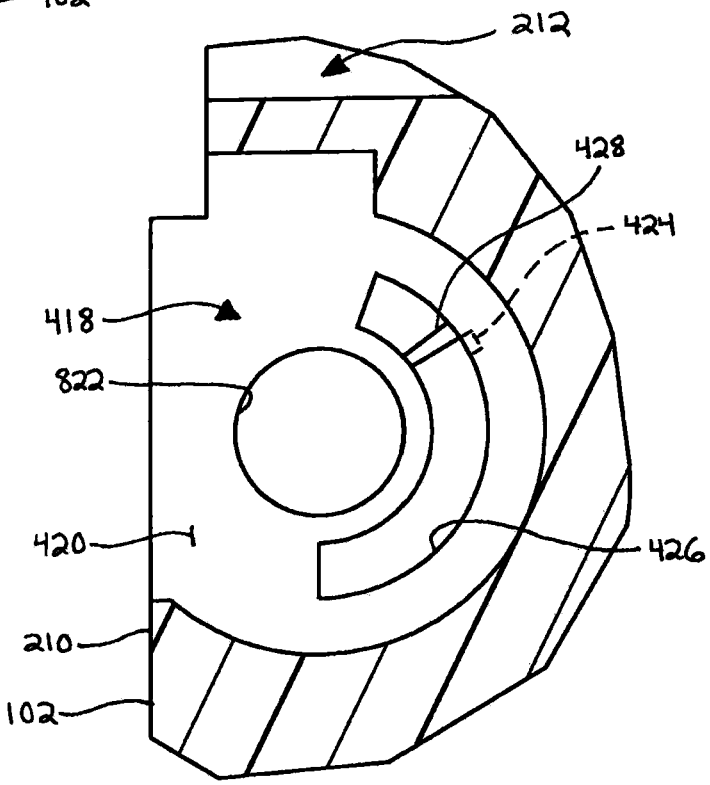
FIG. 11 is a detail view of the area enclosed by line 11-11 of FIG. 9.

Referring to FIGS. 4, 7 and 8, the roller 430 is received within the roller recess 418 with the pivot axle 434 received in the support holes 822 and with the lateral projections 448 received within the detent tracks 426 so the projections 448 limit roller rotation to the arc defined by the tracks 426 (e.g., to approximately 135 degrees). As shown in FIG. 7, when the projections 448 are received at one end of the detent tracks 426, the roller opening (i.e., the cut-away portion) faces out of the roller recess 418 with the unlock surface 442 along the edge of the recess 418 closest to the cover 206. When the projections 448 are at the one end of the detent tracks 426, the projections 448 are restricted by the resilient members 428 until a user applies a force to the roller 430 to store the roller 430 in the position shown in FIG. 4. As such, the detent tracks 426 and the projections 448 provide a detent mechanism to hold the roller 430 in the position shown in FIG. 7. In contrast and as shown in FIG. 4, when the roller 430 is rotated until the projections 448 are at a second end of the tracks 426, the roller opening is located within the recess 418.

The torsion springs 444 each include first and second legs 446 and 452, respectively. The springs 444 are mounted between the roller body 436 and the recess side walls 420 with the first leg 446 engaging the projection 448 on one of the end surfaces 1250 of the roller body 436 and the second leg 452 received in one of the torsion support holes 424 (see FIGS. 4 and 11). The springs 444 are partially loaded when installed to bias the roller 430 toward a locked position (FIGS. 3 and 4) where one end of the track 426 limits roller rotation. When the roller 430 is rotated to an unlocked position (FIGS. 6 and 7), the spring is further loaded and stores energy. When in the unlocked position, the projections 448 are restricted by the resilient members 428 against the spring force.

Referring still to FIGS. 4 and 7, when the cover 206 is attached to the base 102 and the roller 430 is rotated to the unlocked position shown in FIG. 7, the cover 206 can be pivoted to a position wherein the latch 432 is adjacent the roller opening and an undersurface of the foot 456 contacts the roller 430 adjacent the unlock surface 442 (i.e., the open position). When the cover 206 is pressed toward the base 102 adjacent the latch 432, the foot 456 applies a force to the roller 430 tending to rotate the roller 430 in a clockwise direction as shown in FIG. 7. As the roller 430 rotates, the projections 448 are forced by the resilient members 428 and are eventually released so the spring 444 force is unleashed which drives the roller 430 toward the locked position in FIG. 4. As the roller 430 rotates, the lock surface 440 eventually contacts the foot 4513 and forces the foot 456 and the cover 206 into the closed position.

To unlatch the cover 206, a user can drag a finger across the outer surface 438 of the roller 430 to rotate the roller 430 from the locked position to the unlocked position in a counterclockwise direction as illustrated in FIG. 4. As the roller 430 rotates, the lock surface 440 first releases the foot 456 and the load on the torsion springs 444 increases. Eventually, the unlock surface 442 contacts the foot 456 in an intermediate position (e.g., a position in which the roller 430 is rotated about 70 degrees from the lock position) and forces the foot 456 from the roller recess 418. At the end of the opening rotation, the projections 448 are again restricted by the resilient members 428 and the springs 444 are loaded as shown in FIG. 7.

Referring again to FIGS. 4-7, 16, and 17, a second end of the compartment cover 206 supports two slide latches 358. Both of the slide latches 358 are disposed in one of the slide latch recesses 316 in both the open position and the closed position to define a location about which the cover 206 pivots relative to the base 102. When the compartment cover 206 is in the open position the slide latches 358 may be slid from the slide latch recesses 316 to separate the cover 206 from the base 102.

The structure of the electronic mobile device may vary from the embodiments described above without departing from the scope of the disclosure. For example, the compartment cover 206 may be pivotally connected to the base 102 via a pivot pin or the like at the second end of the cover 206. As another example, the roller 430 may include the detent tracks 426 and walls of the roller recess 418 may support the detent projections 448.

Figure 18:
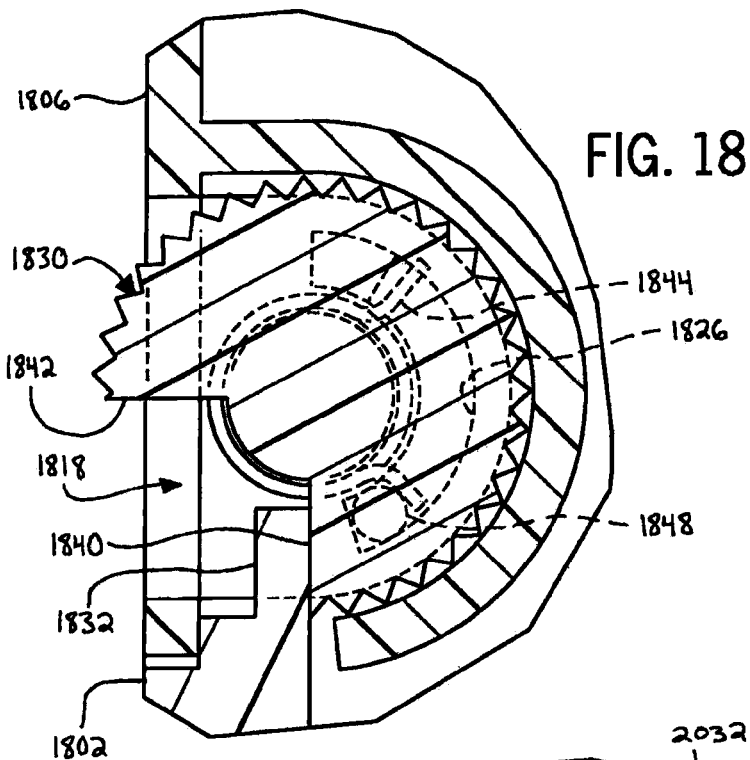
FIG. 18 is a partial side view of a second embodiment of the roller and a latch of the latch mechanism.

As another example and referring now to FIG. 18, in some embodiments a cover 1806 may include a roller recess 1818 that pivotally supports a roller 1830 generally as described above. A base 1802 includes a latch 1832 that engages a lock surface 1840 and an unlock surface 1842 of the roller 1830 in a closed position and an open position of the cover 1806, respectively. That is, the roller 1830 rotates in a counterclockwise or first direction to engage the unlock surface 1842 against the latch 1832 and thereby lift the cover 1806 to the open position. Unlike the embodiments described above, the roller 1830 moves with the cover 1806 relative to the base 1802 between the closed position and the open position. Furthermore, the roller recess 1818 includes detent tracks 1826 to engage roller projections 1848 and thereby hold the roller 1830 in an unlock position. The roller 1830 thereby holds the cover 1806 in the open position. A user may apply a force to the cover 1806 proximate the roller recess 1818 to overcome the holding force provided by the detent tracks 1826 and the projections 1848. Torsion springs 1844 then rotate the roller 1830 in a clockwise or second direction to engage the lock surface 1840 against the latch 1832 and thereby move the cover 1806 to the closed position.

Figure 19:
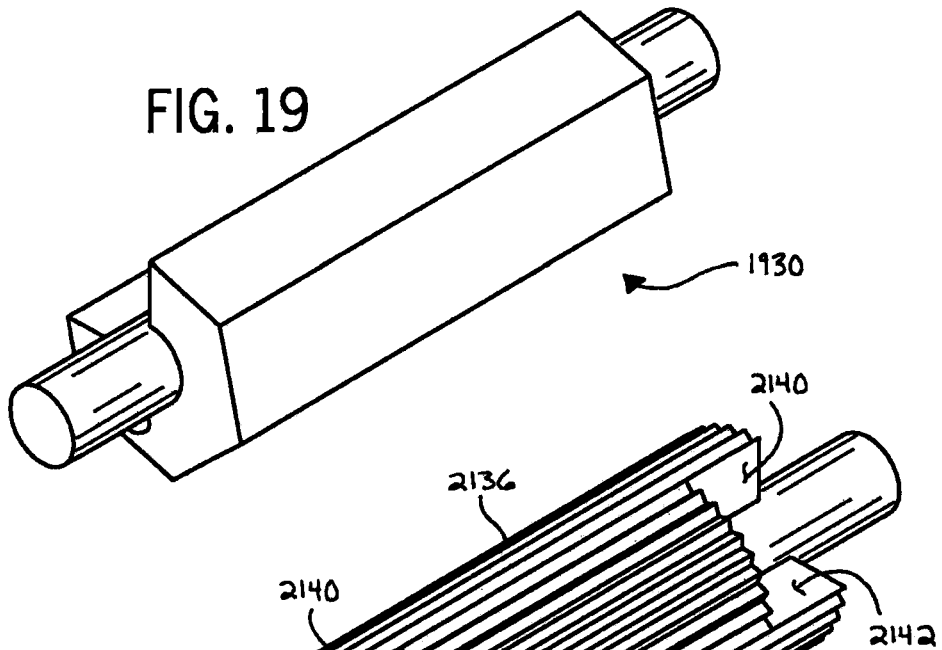
FIG. 19 is a perspective view of a third embodiment of the roller.

As yet another example, the roller may have a cross-section and/or an outer surface shaped differently than those of the embodiments described above. As such and referring to FIG. 19, in some embodiments the device may include a roller 1930 having a generally polygonal cross-sectional shape (e.g., a three-quarter hexagon). The edges of the polygon may be manipulated to move the cover between the closed position and the open position.

Figure 20:
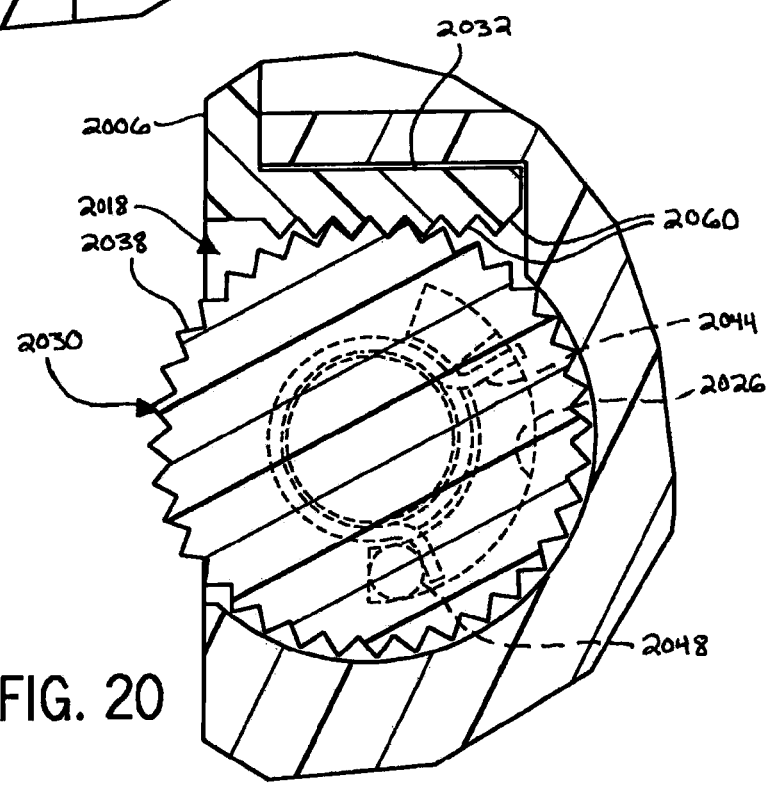
FIG. 20 is a partial side view of a fourth embodiment of the roller and the latch.

As yet another example, the lock surface and the unlock surface of the roller may be angularly spaced apart differently than those of the embodiments described above. Furthermore and referring to FIG. 20, in some embodiments the device includes a roller 2030 that does not have lock and unlock surfaces (i.e., the roller 2030 has a generally full-cylindrical shape). In addition, a latch 2032 includes a plurality of spline teeth 2060 that engage a spline-shaped outer surface 2038 of the roller 2030. As such, the roller 2030 drives the cover 2006 between the closed position and the open position via the spline teeth 2060. That is, the roller 2030 rotates in a counter-clockwise or first direction to drive the latch 2032 away from the base 2002 and thereby lift the cover 2006 to the open position. Furthermore, the roller recess 2018 includes detent tracks 2026 to engage roller projections 2048 and thereby hold the roller 2030 in an unlock position. The roller 2030 thereby holds the cover 2006 in the open position. A user may apply a force to the cover 2006 proximate the roller recess 2018 to overcome the holding force provided by the detent tracks 2026 and the projections 2048. Torsion springs 2044 then rotate the roller 2030 in a clockwise or second direction to drive the latch 2032 toward the base 2002 and thereby move the cover 2006 to the closed position.

Figure 21:
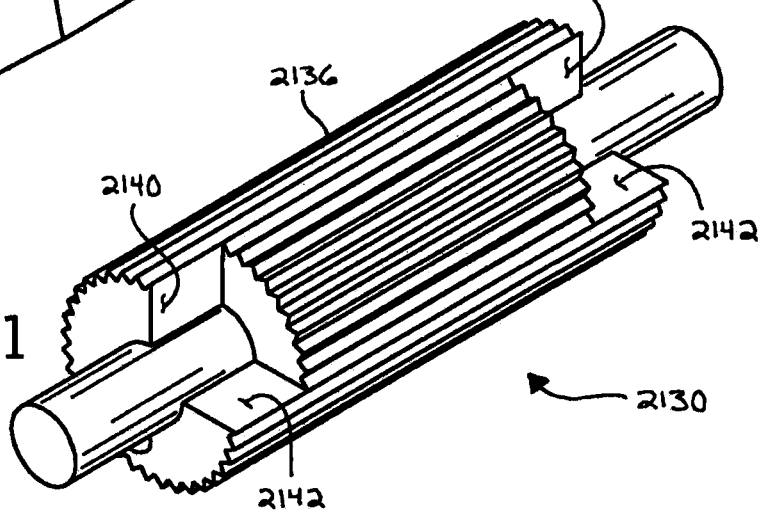
FIG. 21 is a perspective view of a fifth embodiment of the roller.
Figure 22:
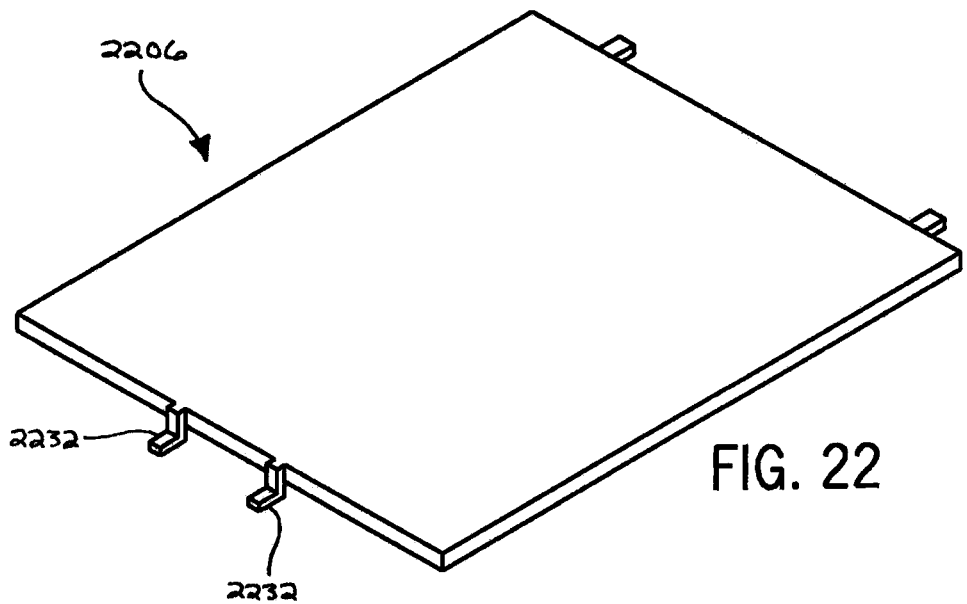
FIG. 22 is a perspective view of a compartment cover for use with the roller of FIG. 21.

As yet another example and referring now to FIG. 21, in some embodiments the device includes a roller 2130 that is a combination of the rollers described above. That is, the roller 2130 includes lock surfaces 2140 and unlock surfaces 2142 separated by a generally full-cylindrical main body 2136. FIG. 22 shows a cover 2206 appropriate for use with the roller 2130. The cover 2206 has spaced apart latches 2232 for engaging each pair of lock surfaces 2140 and unlock surfaces 2142. In operation, the roller 2130 and the cover 2206 interact in the same manner as described in connection with the embodiment of FIGS. 1-14. That is, the roller 2130 rotates in a counter-clockwise or first direction to engage the unlock surfaces 2142 against the latches 2232 and thereby lift the cover 2206 to the open position. The roller 2130 also rotates in a clockwise or second direction to engage the lock surfaces 2140 against the latches 2232 and thereby move the cover 2206 to the closed position. Of course, the latch mechanism may include torsion springs, detent tracks, and roller projections as described above.

From the above description, it should be apparent that the present disclosure provides an electronic mobile device that assists a user in removing a compartment cover by simply disengaging a latch mechanism. This is advantageously achieved by the latch mechanism moving the compartment cover to an open position to enable easy user manipulation.

It should be appreciated that various other modifications and variations to the preferred embodiments can be made within the spirit and scope of the disclosure. Therefore, the disclosure should not be limited to the described embodiments. To ascertain the full scope of the disclosure, the following claims should be referenced.

What is claimed is:

1. An electronic mobile device, comprising:
a base defining a compartment opening;
a cover being movably supported by the base to restrict access to the compartment opening;
a latch supported by the cover, the latch comprising a leg extending perpendicularly from the cover and a foot extending perpendicularly from the leg; and
a roller pivotably supported by the base and having an outer surface, the roller pivoting in a first direction to engage the foot and move the latch relative to the roller and thereby move at least a portion of the cover away from the compartment opening and support the cover when the cover is moved away from the compartment opening, the roller pivoting in a second direction to engage the foot and move the latch relative to the roller and thereby move at least a portion of the cover into a position to restrict access to the compartment opening and hold the cover in the position to restrict access to the compartment opening, and the roller being operable to pivot in the first direction or in the second direction in response to manipulation of the outer surface.

2. The electronic mobile device of claim 1, further comprising a detent mechanism to hold the roller in a position in which the roller holds the at least a portion of the cover away from the compartment opening.

3. The electronic mobile device of claim 1, further comprising a torsion spring biasing the roller to pivot in the second direction.

4. The electronic mobile device of claim 1, wherein the roller includes a lock surface engageable with the foot to thereby hold the cover in the position to restrict access to the compartment opening, and wherein the roller includes an unlock surface engageable with the foot to move the latch relative to the catch and thereby move the at least a portion of the cover away from the compartment opening.

5. An electronic mobile device, comprising:
a base;
a cover removably supported by the base, the cover being movable from a closed position to an open position and vice versa;
a latch supported by the cover, the latch comprising a leg extending perpendicularly from the cover and a foot extending perpendicularly from the leg; and
a roller pivotably supported by the base and having an outer surface, the roller being pivotable in response to manipulation of the outer surface from a lock position to an unlock position and vice versa, in the lock position the roller engaging the foot to thereby hold the cover in the closed position, and in the unlock position the roller engaging the foot to thereby support the cover in the open position.

6. The electronic mobile device of claim 5, wherein the roller includes a lock surface and a unlock surface, in the lock position the lock surface engaging the foot to thereby hold the cover in the closed position, and in the unlock position the unlock surface engaging the foot to thereby support the cover in the open position.

7. The electronic mobile device of claim 6, wherein the unlock surface engages the foot in an intermediate position between the lock position and the unlock position, and engagement between the unlock surface and the foot moves the latch relative to the roller as the roller pivots from the intermediate position to the unlock position.

8. The electronic mobile device of claim 6, wherein the roller has a generally semi-cylindrical shape.

9. The electronic mobile device of claim 5, further comprising:
a detent mechanism to hold the roller in the unlock position when the roller is pivoted to the unlock position; and
a torsion spring biasing the roller toward the lock position.

10. An electronic mobile device, comprising:
a base defining a compartment opening and a roller recess at a first end of the compartment opening;
a cover removably supported by the base, the cover being movable between a closed position and an open position, in the closed position the cover restricting access to the compartment opening, and in the open position at least a portion of the cover being disposed away from the compartment opening;
a latch supported at a first end of the cover, the latch comprising a leg extending perpendicularly from the cover and a foot extending perpendicularly from the leg;

a roller pivotably supported by the base in the roller recess and having an outer surface, the roller being pivotable in response to manipulation of the outer surface in a first direction and a second direction, when pivoting in the first direction the roller moving towards an unlock position in which the roller engages the foot to thereby support the cover in the open position, and when pivoting in the second direction the roller moving towards a lock position in which the roller engages the foot to thereby hold the cover in the closed position;

a detent mechanism holding the roller in the unlock position when the roller is pivoted to the unlock position; and a spring biasing the roller to pivot in the second direction.

11. The electronic mobile device of claim 10, wherein the roller further comprises:

a pivot axle pivotally supported by the base;

a body supported by the pivot axle, the body including:
an outer surface;
a lock surface disposed radially inwardly from the outer surface, in the lock position the lock surface engaging the foot to thereby hold the cover in the closed position; and
an unlock surface disposed radially inwardly from the outer surface, in the unlock position the unlock surface engaging the foot to thereby support the cover in the open position.

12. The electronic mobile device of claim 11, wherein the outer surface of the roller is a tactile outer surface.

13. The electronic mobile device of claim 11, wherein the lock surface and the unlock surface are angularly spaced apart.

14. The electronic mobile device of claim 10, wherein the detent mechanism comprises:

a first detent track at a first side wall of the roller recess; and a first projection supported by a first lateral end of the roller, the first projection sliding within the first detent track as the roller pivots.

15. The electronic mobile device of claim 14, wherein the detent mechanism further comprises:

a second detent track at a second side wall of the roller recess; and a second projection supported by a second lateral end of the roller, the second projection sliding within the second detent track as the roller pivots.

16. The electronic mobile device of claim 10, wherein a second end of the compartment opening includes a slide latch recess, and further comprising a slide latch supported at a second end of the cover, the slide latch being disposed in the slide latch recess when the cover is in both the closed position and the open position.

17. The electronic mobile device of claim 1, wherein the roller has a generally semi-cylindrical shape.

18. The electronic mobile device of claim 10, wherein the roller has a generally semi-cylindrical shape.

19. The electronic mobile device of claim 13, wherein the roller has a generally semi-cylindrical shape.

* * * * *

UNITED STATES PATENT AND TRADEMARK OFFICE
CERTIFICATE OF CORRECTION

PATENT NO.      : 8,562,030 B2  
APPLICATION NO. : 12/626402  
DATED           : October 22, 2013  
INVENTOR(S)     : Cody Allen Bulk Page 1 of 1

It is certified that error appears in the above-identified patent and that said Letters Patent is hereby corrected as shown below:

In the Specification

Column 6, Line 2, "4513" should be --456--.

Signed and Sealed this  
Fourth Day of February, 2014

Michelle K. Lee  
*Deputy Director of the United States Patent and Trademark Office*